United States Patent
Okamoto

(10) Patent No.: US 11,012,584 B2
(45) Date of Patent: May 18, 2021

(54) IMAGE FORMING APPARATUS, METHOD OF PROCESSING IMAGE, AND RECORDING MEDIUM STORING IMAGE PROCESSING PROGRAM

(71) Applicant: SHARP KABUSHIKI KAISHA, Sakai (JP)

(72) Inventor: Takeshi Okamoto, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 16/586,902

(22) Filed: Sep. 27, 2019

(65) Prior Publication Data
US 2020/0128146 A1 Apr. 23, 2020

(30) Foreign Application Priority Data
Oct. 18, 2018 (JP) .............................. JP2018-196568

(51) Int. Cl.
*H04N 1/00* (2006.01)
(52) U.S. Cl.
CPC ..... *H04N 1/00782* (2013.01); *H04N 1/00331* (2013.01); *H04N 1/00663* (2013.01); *H04N 1/00737* (2013.01); *H04N 1/00766* (2013.01)
(58) Field of Classification Search
CPC ........... H04N 5/23293; H04N 5/23296; H04N 9/045; H04N 19/51; H04N 19/593; H04N 1/00; H04N 1/00411; H04N 1/00801; H04N 1/02805; H04N 1/02835; H04N 1/10; H04N 1/107; H04N 2201/0081; G06K 9/00442; G06K 9/3216; G06K 9/033; G06K 9/186; G06K 15/02; G06K 2209/011; G06K 2215/0082; G06K 9/20; B07C 3/00; G01C 11/025; G01C 15/00; G06T 1/00; G06T 1/0007; G06T 1/60; G09F 9/00
USPC ......................................... 358/474
See application file for complete search history.

(56) References Cited

U.S. PATENT DOCUMENTS

| | | | | | |
|---|---|---|---|---|---|
| 4,468,704 A | * | 8/1984 | Stoffel | ................. | H04N 1/403 358/464 |
| 4,593,325 A | * | 6/1986 | Kannapell | .............. | H04N 1/403 358/3.22 |
| 4,702,589 A | * | 10/1987 | Ito | .......................... | G03G 15/50 355/24 |
| 4,811,416 A | * | 3/1989 | Nakamura | .............. | G06F 3/018 358/443 |
| 4,885,784 A | * | 12/1989 | Miyagawa | ............... | G06K 9/38 382/141 |
| 5,278,669 A | * | 1/1994 | Takemoto | .......... | H04N 1/00795 348/96 |
| 6,044,179 A | * | 3/2000 | Savakis | ................... | G06K 9/38 358/464 |

(Continued)

FOREIGN PATENT DOCUMENTS

JP       2008-186451 A    8/2008

*Primary Examiner* — Negussie Worku
(74) *Attorney, Agent, or Firm* — ScienBiziP, P.C.

(57) ABSTRACT

An image forming apparatus includes a document reader that scans a document and outputs an image of the document, a process selector that selects a process to be executed on the image depending on a document scanning region scanned in the document reader, and a controller that performs control to execute the process selected by the process selector on the image.

15 Claims, 8 Drawing Sheets

(56) References Cited

U.S. PATENT DOCUMENTS

| | | | | |
|---|---|---|---|---|
| 6,195,474 B1* | 2/2001 | Snyder | ............... | G06T 5/009 |
| | | | | 382/128 |
| 7,675,523 B2* | 3/2010 | Ushida | ............. | G06T 1/0007 |
| | | | | 345/537 |
| 2001/0035458 A1* | 11/2001 | Schum | ............. | G06K 9/3216 |
| | | | | 235/462.08 |
| 2002/0025081 A1* | 2/2002 | Kumazawa | ......... | H04N 1/3878 |
| | | | | 382/289 |
| 2002/0076102 A1* | 6/2002 | Nagarajan | ............ | H04N 1/4074 |
| | | | | 382/168 |
| 2005/0270391 A1* | 12/2005 | Watanabe | ............ | H04N 9/045 |
| | | | | 348/294 |
| 2006/0036934 A1* | 2/2006 | Fujiwara | ............ | H04N 1/444 |
| | | | | 715/203 |
| 2007/0110277 A1* | 5/2007 | Hayduchok | ............. | B07C 3/00 |
| | | | | 382/101 |
| 2007/0196014 A1* | 8/2007 | Yamamoto | ............. | G06T 7/11 |
| | | | | 382/169 |
| 2009/0025081 A1* | 1/2009 | Quigley | ............. | G06F 21/32 |
| | | | | 726/21 |
| 2009/0059022 A1* | 3/2009 | Tanaka | ............ | H04N 1/00442 |
| | | | | 348/222.1 |
| 2009/0059256 A1* | 3/2009 | Hasegawa | ............. | H04N 1/60 |
| | | | | 358/1.9 |
| 2012/0062868 A1* | 3/2012 | Kludas | ............ | G01C 15/00 |
| | | | | 356/4.01 |
| 2012/0194875 A1* | 8/2012 | Ozaki | ............. | H04N 1/40056 |
| | | | | 358/448 |
| 2013/0027748 A1* | 1/2013 | Nishikawa | ........... | H04N 1/4092 |
| | | | | 358/1.16 |
| 2014/0061305 A1* | 3/2014 | Nahill | ............. | G06K 7/1096 |
| | | | | 235/438 |
| 2017/0085737 A1* | 3/2017 | Morikawa | ............. | G06K 9/20 |

* cited by examiner

IMAGE FORMING APPARATUS, METHOD OF PROCESSING IMAGE, AND RECORDING MEDIUM STORING IMAGE PROCESSING PROGRAM

BACKGROUND OF THE INVENTION

Field of the Invention

The present invention relates to an image forming apparatus, a method of processing an image, and a medium storing an image processing program, and more particularly to an image forming apparatus that includes a document reader that scans a document, a method of processing an image, and a medium storing an image processing program.

Description of the Background Art

There is a known technique in which layout analysis, character recognition, and the like are performed on scanned images of forms, such as receipts and invoices, acquired by a scanner, and predetermined character strings or the like are automatically extracted and saved when the format of the scanned image coincide with a predetermined format.

For example, a document data manager according to the related art acquires digitized document data through scanning by an image reader. If the acquired text data is determined through layout analysis to have a predetermined format, the reliability of the image scanning process by the image reader is automatically determined on the basis of the character string of the object extracted through layout analysis and the predetermined format corresponding to the type of the object. If the reliability is lower than a predetermined threshold, the text data is prohibited from being saved (refer to Japanese Patent No. 5005554 (Japanese Unexamined Patent Application Publication No. 2008-186451)).

Unfortunately the accuracy of the automatic detection of format according to the technology proposed in Japanese Patent No. 5005554 is impaired when there are multiple forms having similar formats. If the format is not automatically detected, and instead, selected manually using a touch panel or the like, scanning multiple forms having different formats using a scanner will be troublesome.

An object of the present invention, which has been conceived in light of the above-described issues, is to provide an image forming apparatus that can correctly select the process to be executed on a scanning image acquired by a scanner scanning a form or the like, and thereby enhance work efficiency.

SUMMARY OF THE INVENTION

An image forming apparatus according to an embodiment of the present invention includes a document reader that scans a document and outputs an image of the document, a process selector that selects a process to be executed on the image depending on a document scanning region of the document reader, the document being scanned in the document scanning region, and a controller that performs control to execute the process selected by the process selector on the image.

A method of processing a scanning image according to an embodiment of the present invention includes scanning a document, outputting an image of the document, selecting a process to be executed on the image depending on a document scanning region, the document being scanned in the document scanning region by scan for a document, and performing control to execute a process selected by selection of a process to be executed on the image.

A recording medium according to an embodiment of the present invention, on which a scanning image processing program is stored, the program being executed to instruct a computer to scan a document, output an image of the document, select a process to be executed on the image by scan for a document depending on a document scanning region, and perform control to execute the process selected by selection of a process to be executed on the image.

An image forming apparatus according to an embodiment of the present invention includes a document reader that scans a document and outputs an image of the document, a process selector that selects a process to be executed on the image depending on a document scanning region of the document reader, the document being scanned in the document scanning region, and a controller that performs control to execute the process selected by the process selector on the image. In this way, the image forming apparatus can be provided in which the process to be executed can be correctly selected depending on the document scanning sub-regions without the user selecting the process to be executed on the image acquired by scanning the document, and the efficiency of workability can be enhanced.

DESCRIPTION OF THE PREFERRED EMBODIMENTS

First Embodiment

The first embodiment of the present invention will now be described with reference to the accompanying drawings.

Figure 1:
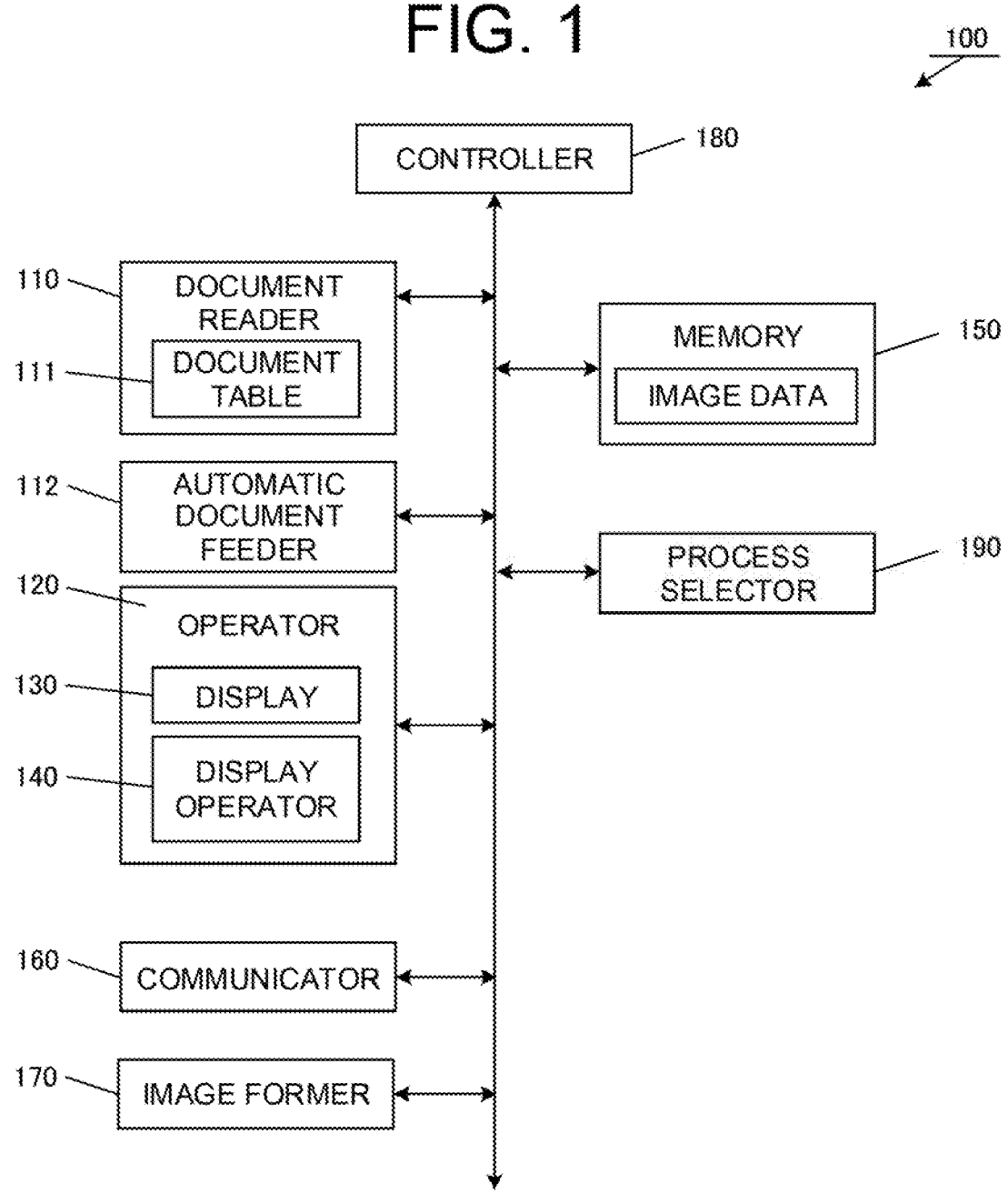
FIG. 1 is a block diagram illustrating a configuration of main components of an image forming apparatus according to a first embodiment.
Figure 2:
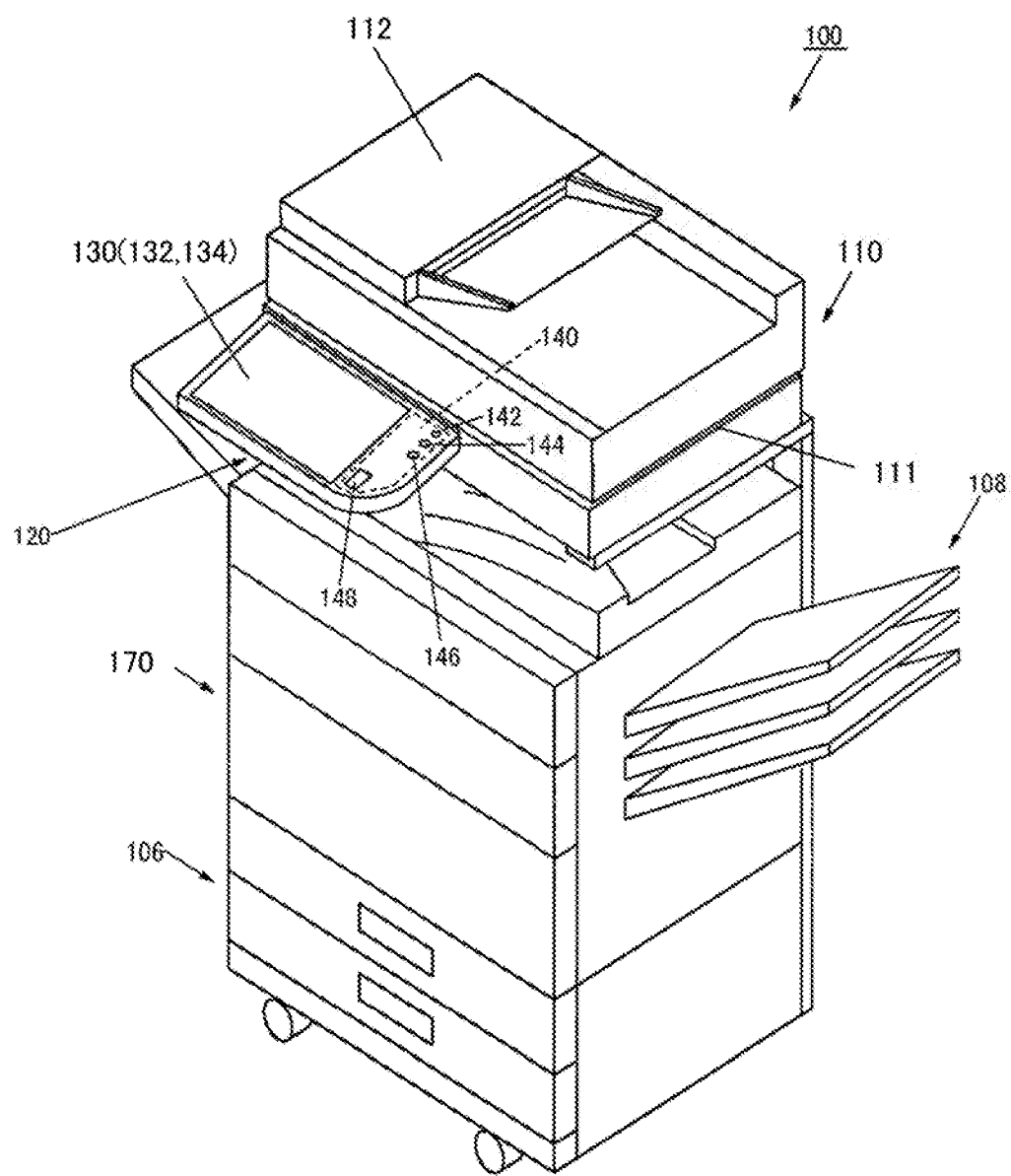
FIG. 2 illustrates an overall configuration of the image forming apparatus.

FIG. 1 is a block diagram illustrating a configuration of main components of an image forming apparatus 100 according to a first embodiment. FIG. 2 illustrates an overall configuration of the image forming apparatus.

With reference to FIG. 1, the image forming apparatus 100 according to the first embodiment mainly includes a document reader 110, an automatic document feeder 112, an operator 120, a memory 150, and a communicator 160, an image former 170, a controller 180 that controls an operation of the components of the image forming apparatus 100, and a process selector 190.

Configuration of Image Forming Apparatus

A basic configuration of the image forming apparatus 100 according to the first embodiment will now be described. The configuration according to the present invention may be applied to an image processing apparatus or an electronic apparatus, besides an image forming apparatus.

The image forming apparatus 100 forms an image on a recording sheet through electrophotography.

The image forming apparatus 100 has following operation modes: a copy mode, a facsimile (FAX) mode, a document filing mode, and a mailing mode. In the document filing mode, a scanning image is stored in the memory in the image forming apparatus. In the mailing mode, the scanning image is transmitted in the form of an attachment to electronic mail.

As illustrated in FIG. 2, the image forming apparatus 100 mainly includes a document reader 110, an image former 170, a sheet feeder 106, a sheet ejector 108, and an operator 120.

The document reader 110 is mounted on the upper side of the image forming apparatus 100. The document reader 110 includes a document table (for example, a document glass) 111 on which each one of the documents to be scanned are placed. An automatic document feeder 112 is disposed in the upper portion of the document reader 110.

One or more documents are placed on the automatic document feeder 112. The document feeder 112 feeds the documents one by one to the document reader 110.

The operator 120 includes a display 130 and a display operator 140. The display 130 includes a display panel 132 and a touch panel 134, which are liquid crystal panels or the like.

A preview display area of the display panel 132 is provided with a selection button that is a software button. When the area in which the selection button is displayed is pressed with a finger, the touch panel 134 detects the pressed position. A program checks the pressed position of the touch panel 134 against the displayed position of the selection button, to instruct various operations of the image forming apparatus 100, including selection of an operation mode and selection of a function. The image forming apparatus 100 supports not only such a touch operation but also a gesture operation.

The display operator 140 includes an indicator lamp 142, a power key 144, a power saving key 146, and a home key 148 for returning screen of the display 130 to the home screen for selecting the operation mode.

The image forming apparatus 100 includes the display 130 as the main operation device and the display operator 140 that includes hardware keys and an indicator lamp. The keys of the display operator 140 are hardware buttons, unlike the software buttons of the display 130.

Note that the image forming apparatus 100 is not limited to one including the display operator 140 having such a configuration, and may include only the display 130. The display 130 may be any display that can switch to an initial screen corresponding to the selected operation mode in response to the user selecting an operation mode on the home screen displayed on the display 130.

The memory 150 stores image data of documents scanned by the document reader 110. The memory 150 also stores programs and data necessary for controlling the operation of the image forming apparatus 100.

The communicator 160 is a functional unit for establishing communication between the image forming apparatus 100 and an external device.

The image former 170 is a functional unit for forming an image of output data based on image data on a recording medium (for example, a recording sheet). The image former 170 includes, for example, an electrophotographic laser printer.

The controller 180 controls the image forming apparatus 100 in accordance with the program and data stored in the memory 150, and executes control involving the functions of the image forming apparatus 100.

Configuration of Image Forming Apparatus

The configuration of the image forming apparatus 100 according to the first embodiment will now be described with reference to the drawings.

As illustrated in FIG. 1, the image forming apparatus 100 according to the first embodiment includes the document reader 110, the operator 120, the memory 150, the communicator 160, the image former 170, the controller 180, and the process selector 190.

The document reader 110 has multiple regions in which documents are scanned (hereinafter referred to as "document scanning sub-regions"). In the first embodiment, the document scanning region on the document table 111 of the document reader 110 is divided into multiple document scanning sub-regions.

The document reader 110 are assigned processes to be executed on the image scanned by the document scanning sub-regions in the corresponding document scanning sub-regions.

Specifically, the document reader 110 changes the process to be executed on an image acquired by scanning a document and the operating conditions of the image forming apparatus 100 depending on the position of the document, the orientation of the document (vertical or horizontal), the type of the document, etc., in the document scanning sub-regions on the document table 111.

The process selector 190 selects the process assigned in advance for the image scanned by the document scanning sub-region in the corresponding multiple document scanning sub-region.

The controller 180 performs control involving the functions of the image forming apparatus 100 and executed the process determined by the process selector 190.

Process of Scanning Document

The process of scanning a document by the document reader 110 of the image forming apparatus 100 according to the first embodiment will now be described with reference to a flowchart.

Figure 3:
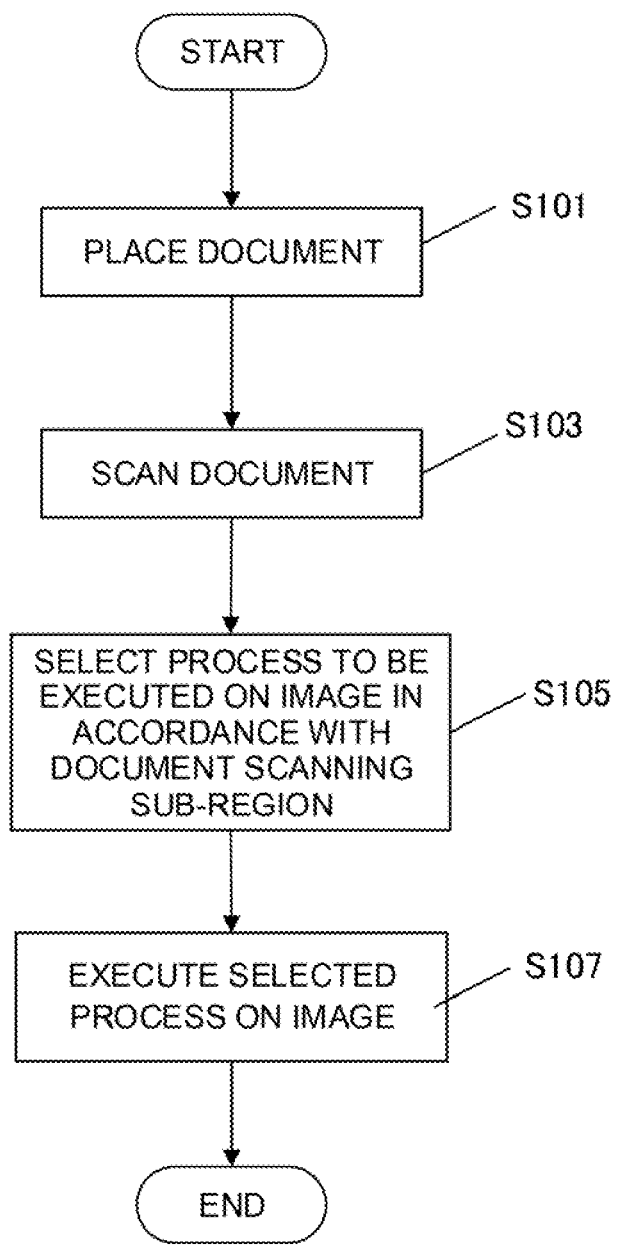
FIG. 3 is a flowchart illustrating an example of a document scanning process by a document reader of the image forming apparatus.

FIG. 3 is a flowchart illustrating an example process of scanning a document by the document reader 110 of the image forming apparatus 100 according to the first embodiment.

As illustrated in FIG. 3, when the document reader 110 of the image forming apparatus 100 is to scan documents, the documents are placed on the document table 111 (step S101). The multiple documents are placed in the multiple document scanning sub-regions set in advance corresponding to each document.

The document reader 110 scans the documents in the corresponding document scanning sub-regions (step S103). The process selector 190 selects the process to be executed on the image data of each document scanned in the corresponding document scanning sub-region (step S105).

The controller 180 executes the process selected for each of the scanned images (step S107). In this way, the scanning process of the documents is executed.

First Example

In the first example in the document scanning sub-regions of the document table 111, multiple documents can be scanned depending on the format of the documents to be scanned in the corresponding document scanning sub-region.

Figure 4:
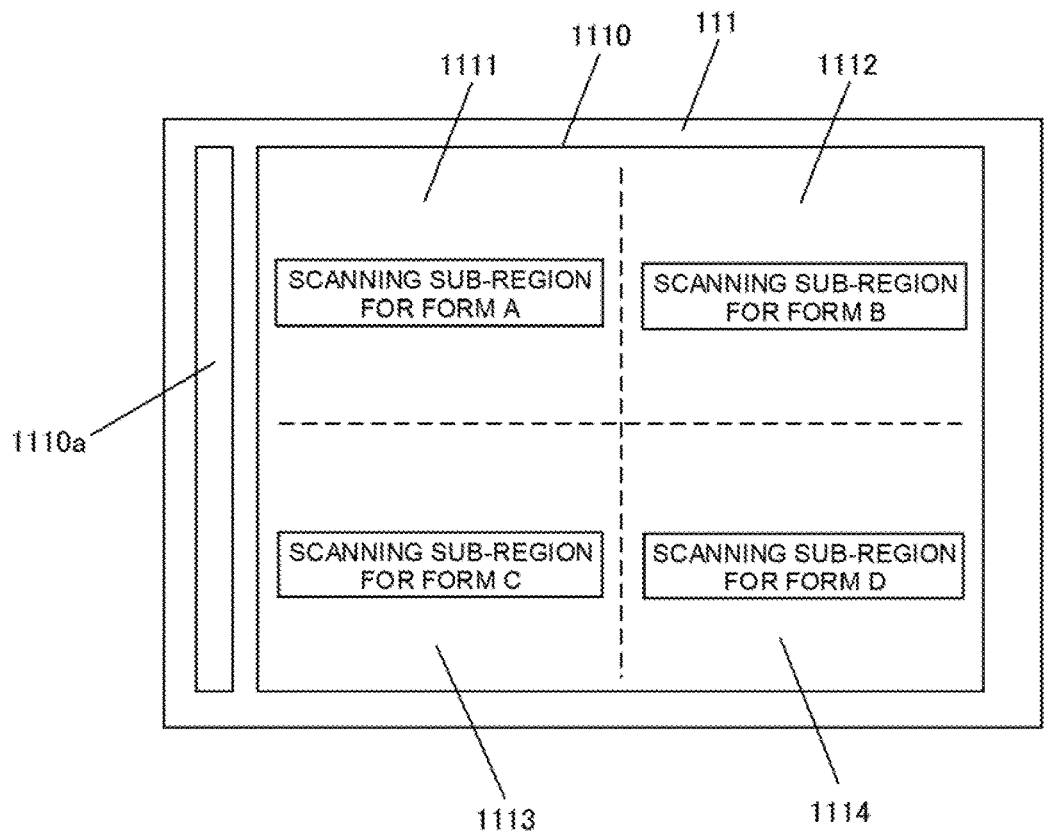
FIG. 4 illustrates a first example of the configuration of the document reader of the image forming apparatus, supporting multiple document formats.

FIG. 4 illustrates a first example of the configuration of the document reader of the image forming apparatus according to the first embodiment that supports multiple document formats.

In the first example, the document reader 110 supports four different formats, such as forms A, B, C, and D, for documents to be scanned in the respective document scanning sub-regions.

As illustrated in FIG. 4, the document table 111 of the document reader 110 has a document scanning region 1110 in which documents are scanned, and an automatic-feeder scanning region 1110a.

The document scanning region 1110 includes a first document scanning sub-region 1111, a second document scanning sub-region 1112, a third document scanning sub-region 1113, and a fourth document scanning sub-region 1114.

The automatic-feeder scanning region 1110a may be provided separately from the document table 111.

The automatic-feeder scanning region 1110a supports scanning of documents transported by the automatic document feeder 112.

The first document scanning sub-region 1111, the second document scanning sub-region 1112, the third document scanning sub-region 1113, and the fourth document scanning sub-region 1114 support different formats.

In the first example, the process selector 190 executes a scanning process corresponding to the format of the placed document depending on each document scanning sub-region.

In the first document scanning sub-region 1111, a scanning process corresponding to the format of form A is executed.

In the second document scanning sub-region 1112, a scanning process corresponding to the format of form B is executed.

In the third document scanning sub-region 1113, a scanning process corresponding to the format of form C is executed.

In the fourth document scanning sub-region 1114, a scanning process corresponding to the format of form D is executed.

An example of extraction of information in a form scanned in the document scanning region of the document table 111 of the document reader 110 according to the first example will now be described.

Figure 5A:
FIGS. 5A and 5B illustrate examples in which information is extracted from documents scanned by the document reader of the image forming apparatus.
Figure 5B:

FIGS. 5A and 5B illustrate examples in which information is extracted from documents scanned by the document reader of the image forming apparatus.

With respect to an image in a form, layout and character recognition are performed for different types of forms. Based on the recognition, items to be extracted, character strings, and the like are set for each type of form, and how to extract the information in what position is determined. Forms A and B will now be described as examples.

As illustrated in FIG. 5A, a first image 111A1 of the scanned form A includes four rows of character strings. Information is extracted from the first image 111A1 to form a second image 111A2 that includes a table containing five rows of character strings.

As illustrated in FIG. 5B, a first image 111B1 of the scanned form B includes three rows of character strings. Information is extracted from the first image 111B1 to form a second image 111B2 that includes a table containing three rows of character strings.

In the first example, forms having four different formats can be scanned through a single document scanning process.

Note that, in the first example, forms having four different formats are scanned in the respective four document scanning sub-regions of the document scanning region. However, the number of documents scanning sub-regions and types of forms to be scanned are not limited thereto.

Second Example

In the second example, in the document scanning sub-regions of the document table 111, multiple documents can be scanned depending on languages of the documents to be scanned in the corresponding document scanning sub-region.

Figure 6:
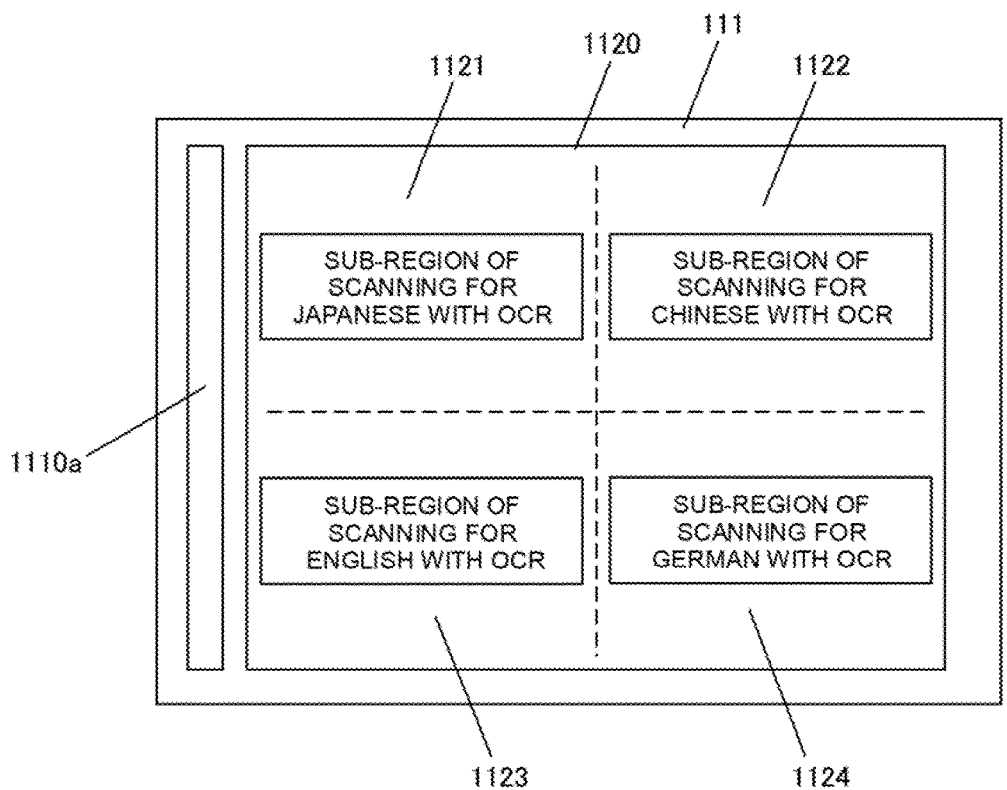
FIG. 6 illustrates a second example of the configuration of a document table of the image forming apparatus, supporting different languages in multiple documents.

FIG. 6 illustrates a second example of a configuration of the document table 111 of the image forming apparatus 100 according to the first embodiment that supports scanning of multiple documents in different languages.

In the second example, the document reader 110 scans documents in four different languages, such as Japanese, Chinese, English, and German, in the respective document scanning sub-regions.

As illustrated in FIG. 6, the document table 111 of the document reader 110 has a document scanning region 1120 in which placed documents are scanned, and an automatic-feeder scanning region 1110a.

The document scanning region 1120 includes a first document scanning sub-region 1121, a second document scanning sub-region 1122, a third document scanning sub-region 1123, and a fourth document scanning sub-region 1124.

The first document scanning sub-region 1121, the second document scanning sub-region 1122, the third document scanning sub-region 1123, and the fourth document scanning sub-region 1124 support documents in different languages.

In the second example, the process selector 190 changes the language settings of an optical character reader (OCR) depending on the document scanning sub-regions to scan the documents in the relevant languages.

In the first document scanning sub-region 1121, a scanning process for Japanese is executed.

In the second document scanning sub-region 1122, a scanning process for Chinese is executed.

In the third document scanning sub-region 1123, a scanning process for English is executed.

In the fourth document scanning sub-region 1124, a scanning process for German is executed.

In the second example, documents in four different languages can be scanned through a single document scanning process.

Note that, in the second example, documents in four different languages are scanned in the respective four document scanning sub-regions of the document scanning region. However, the number of documents scanning sub-regions and language of scanned documents are not limited thereto.

Third Example

Figure 7:
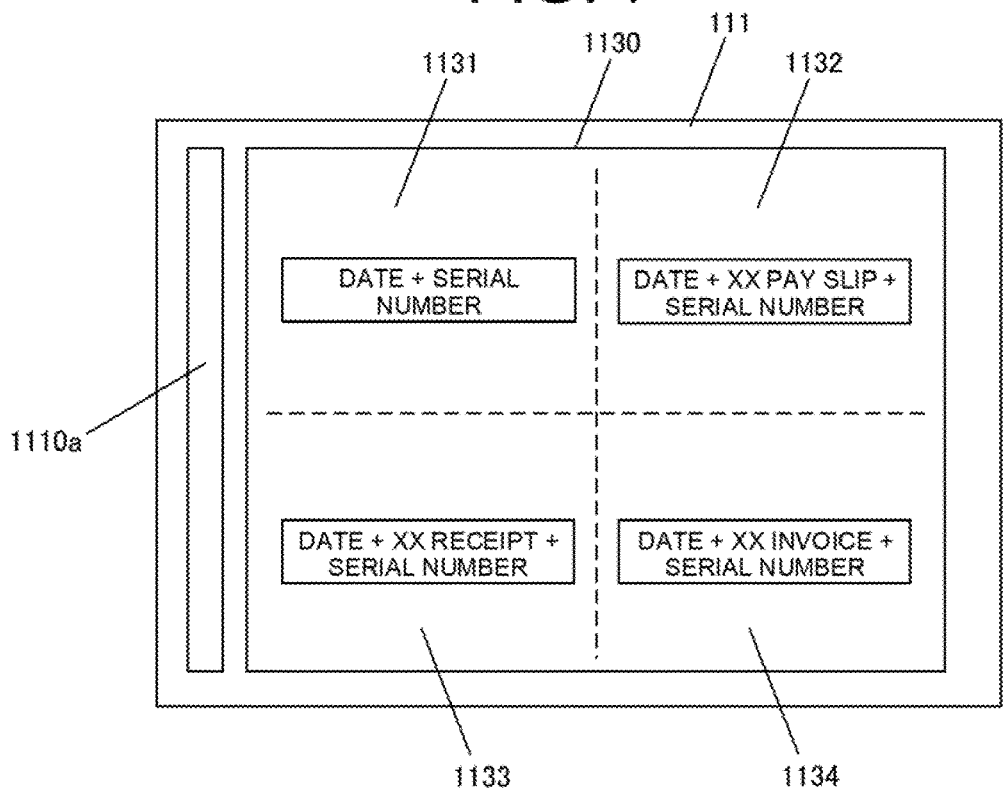
FIG. 7 illustrates a third example of a configuration of the document table of the image forming apparatus that establishes naming rules for naming files of image data of documents depending on the document scanning sub-regions in which the documents are scanned.

In the third example, in the document scanning sub-regions of the document table 111, naming rules for naming files of image data of images scanned in the document scanning sub-regions are assigned. FIG. 7 illustrates a third example of a configuration of the document table 111 of the image forming apparatus 100 according to the first embodiment that establishes naming rules for naming files of image data of documents depending on the document scanning sub-regions in which the documents are scanned.

In the third example, the document reader 110 names the files of image data of the documents scanned in the respective document scanning sub-regions in accordance with four different naming rules, such as (date+serial number), (date+XX pay slip+serial number), (date+XX receipt+serial number), and (date+XX invoice+serial number).

As illustrated in FIG. 7, the document table 111 of the document reader 110 includes a document scanning region 1130 in which placed documents are scanned, and an automatic-feeder scanning region 1110a.

The document scanning region 1130 includes a first document scanning sub-region 1131, a second document scanning sub-region 1132, a third document scanning sub-region 1133, and a fourth document scanning sub-region 1134.

The first document scanning sub-region 1131, the second document scanning sub-region 1132, the third document scanning sub-region 1133, and the fourth document scanning sub-region 1134 provide different file names to the scanning images.

In the third example, the process selector 190 provides different file names to the scanning images in accordance with the naming rules assigned to the corresponding document scanning sub-regions.

In the first document scanning sub-region 1131, the file name is determined in accordance with the naming rule "date+serial number."

In the second document scanning sub-region 1132, the file name is determined in accordance with the naming rule "date+XX pay slip+serial number."

In the third document scanning sub-region 1133, the file name is determined in accordance with the naming rule "date+XX receipt+serial number."

In the fourth document scanning sub-region 1134, the file name is determined in accordance with the naming rule "date+XX invoice+serial number."

In the third example as described above, the images scanned in the respective document scanning sub-regions can be provided different file names in accordance with different naming rules.

Note that, in the third example, documents scanned in the respective four document scanning sub-regions of the document scanning region are provided with file names in accordance with four different naming rules. However, the number of documents scanning sub-regions and naming rules are not limited thereto.

Fourth Example

In the fourth example, in the document scanning sub-regions of the document table 111, file formats for files of image data of images scanned in the document scanning sub-regions are assigned.

Figure 8:
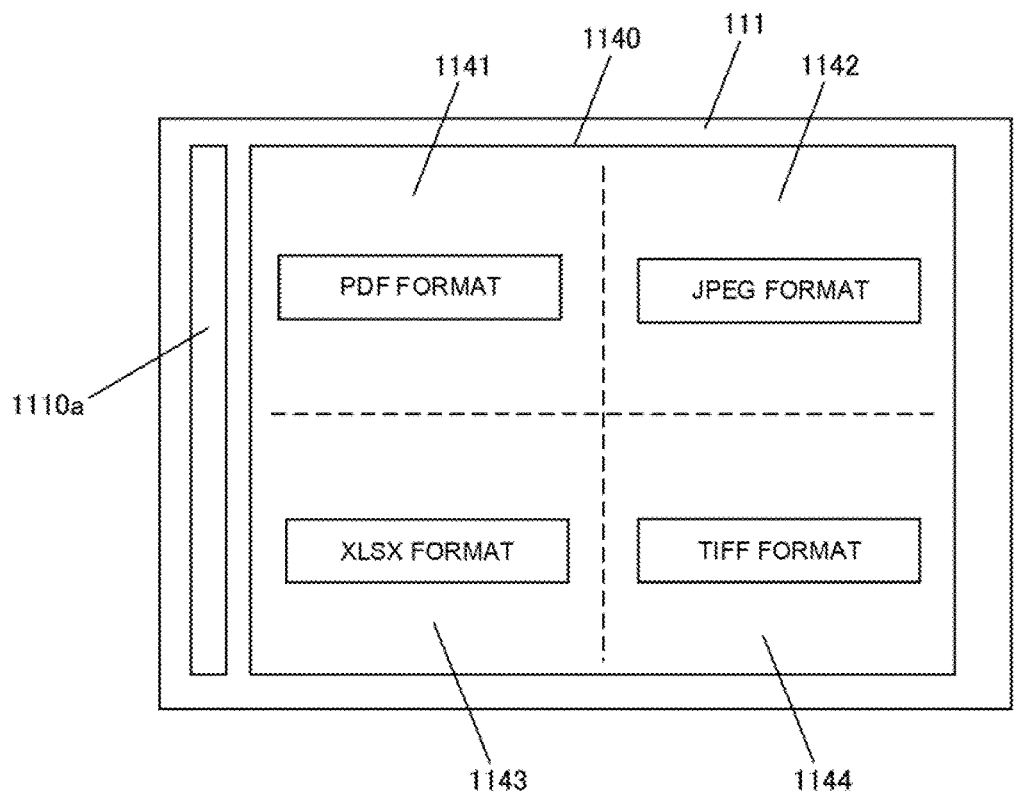
FIG. 8 illustrates the fourth example of a configuration of the document table of the image forming apparatus that specifies file formats of image data of documents depending on the document scanning sub-regions in which the documents are scanned.

FIG. 8 illustrates the fourth example of a configuration of the document table 111 of the image forming apparatus 100 according to the first embodiment that specifies file formats of image data of documents depending on the document scanning sub-regions in which the documents are scanned.

In the fourth example, the document reader 110 specifies the file formats of in: data of the scanned documents to be, for example, four different file formats of PDF format, JPEG format, XLSX format, and TIFF format, depending on the respective document scanning sub-regions in which the documents are scanned.

As illustrated in FIG. 8, the document table 111 of the document reader 110 includes document scanning region 1140 in which placed documents are scanned, and an automatic-feeder scanning region 1110a.

The document scanning region 1140 includes a first document scanning sub-region 1141, a second document scanning sub-region 1142, a third document scanning sub-region 1143, and a fourth document scanning sub-region 1144.

The image of documents scanned in the first document scanning sub-region 1141, the second document scanning sub-region 1142, the third document scanning sub-region 1143, and the fourth document scanning sub-region 1144 respectively have different file formats.

In the fourth example, the process selector 190 specifies different predetermined file formats for the scanning images depending on the respective document scanning sub-regions.

The first document scanning sub-region 1141 generates a file in a PDF format.

The second document g sub-region 1142 generates a file in a JPEG format.

The third document scanning sub-region 1143 generates a file in an XLSX format.

The fourth document scanning sub-region 1144 generates a file in a TIFF format.

As described above, in the fourth example, the scanning images can have different file formats in according with the respective document scanning sub-regions in which the documents are scanned.

Note that, in the fourth example, scanned documents have different file formats depending on the respective four document scanning sub-regions of the document scanning region in which the documents are scanned. However, the number of documents scanning sub-regions and types of file formats are not limited thereto.

Fifth Example

In the fifth example, in the document scanning sub-regions of the document table 111, storage destinations for image data of images scanned in the respective document scanning sub-regions are assigned.

The storage destination of image data may be, for example, a file folder configured in the memory 150 of the image forming apparatus 100. Alternatively, the storage destination of image data may be an external server.

Sixth Example

In the sixth example, in the document scanning sub-regions of the document table 111, transmission destinations for image data of images scanned in the respective document scanning sub-regions are assigned.

The transmission destination of image data may be, for example, a predetermined mailing address, a designated mailing address, or a file transfer protocol (FTP). Alternatively, the transmission destination of image data may be an external server.

The image forming apparatus 100 according to the first embodiment having the above-described configuration includes a document reader 110, a process selector 190, and a controller 180. The process selector 190 selects the process to be executed on the scanning image depending on the document scanning sub-regions of the document reader 110. The controller 180 executes the process on the selected image. In this way, the process to be executed can be correctly selected depending on the document scanning sub-regions without the user selecting the process to be executed on the image. This can enhance the efficiency of workability.

For example, the processes to be executed on images acquired by scanning documents in the document scanning sub-regions of the document reader 110 are preset. The process selector 190 selects the preset process to be executed on a scanning image depending on the document scanning sub-region in which the image is scanned. In this way, the process to be executed can be correctly selected depending on the document scanning sub-regions without the user selecting the process to be executed on the image acquired by scanning the document. This can enhance the efficiency of workability.

Second Embodiment

A second embodiment will now be described with reference to the accompanying drawings.

An image forming apparatus 100 according to the second embodiment is the same as the image forming apparatus 100 according to the first embodiment, except that the process selector specifies the output mode of a document in accordance with the document scanning sub-region of the document reader in which the document is scanned.

Figure 9:
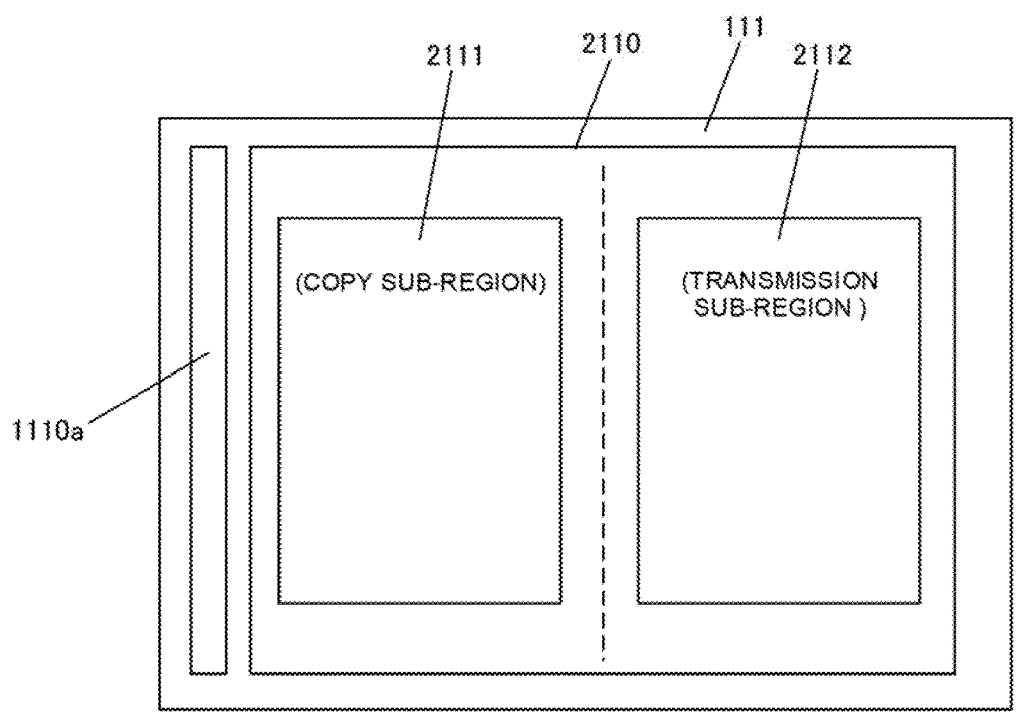
FIG. 9 illustrates an example configuration of a document reader of an image forming apparatus according to a second embodiment that supports different output modes.
Figure 10:
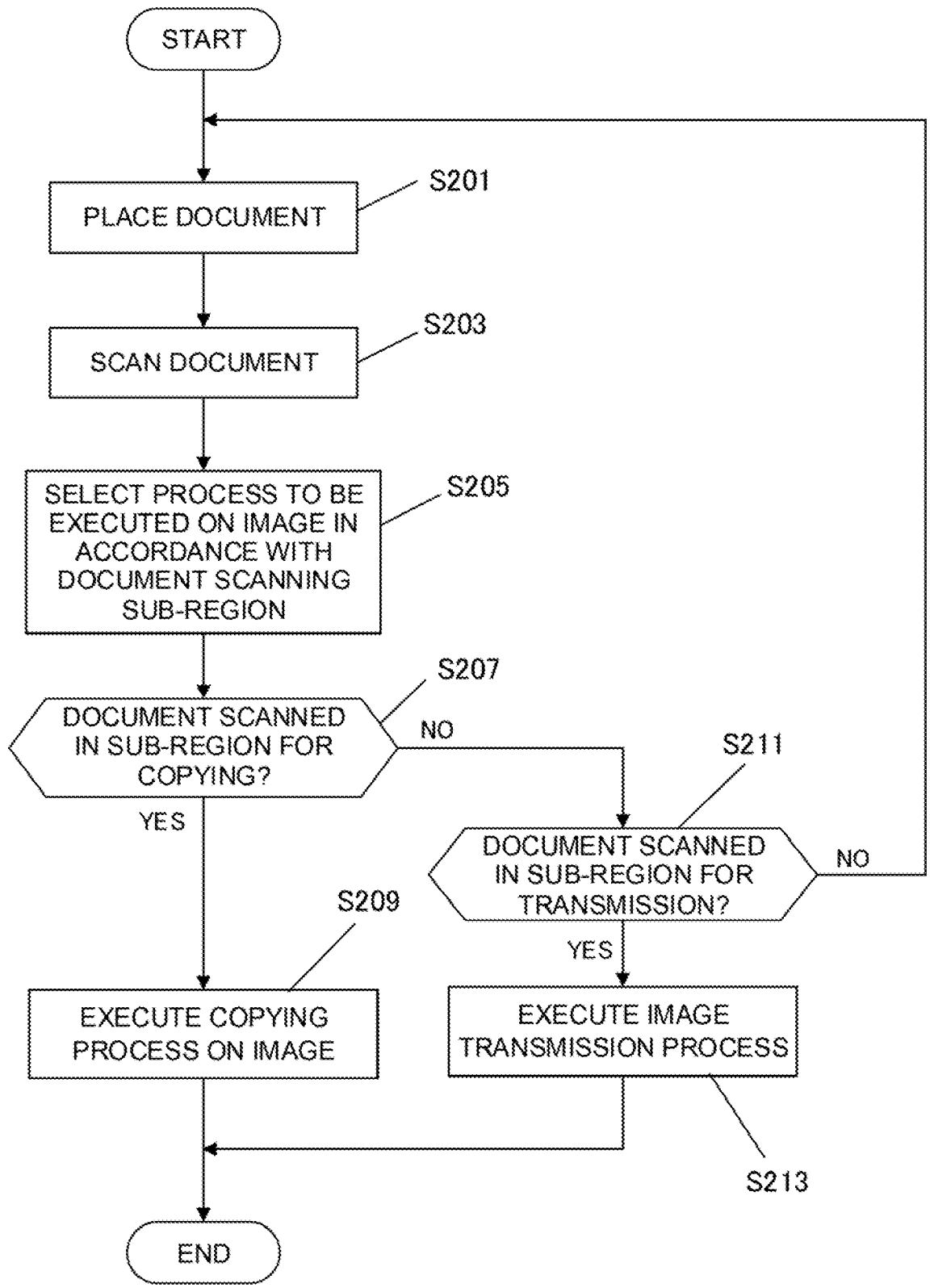
FIG. 10 is a flowchart illustrating an example process of specifying an output mode depending on a document scanning sub-region in the image forming apparatus.

FIG. 9 illustrates an example configuration of a document reader of the image forming apparatus 100 according to the second embodiment supporting different output modes. FIG. 10 is a flowchart illustrating an example process of specifying the output mode depending on the document scanning sub-region in the image forming apparatus.

Note that, components having the same functions as those according to the first embodiment are denoted by the same reference signs, and descriptions thereof are omitted.

In the second embodiment, as illustrated in FIG. 9, a document scanning region 2110 of the document table 111 of the image forming apparatus 100 has a copy sub-region 2111 and a transmission sub-region 2112.

When a document is scanned in the copy sub-region 2111, the process selector 190 instructs a copying process to be executed on the acquired image. When a document is scanned in the transmission sub-region 2112, the process selector 190 instructs a transmission process to be executed to send the acquired image to the memory 150.

Note that, the output modes (for example, output for copying, transmission, storage, and facsimile) assigned to the document scanning sub-regions can be appropriately selected or changed.

Process of Scanning Document

The process of specifying the output mode depending on a document scanning sub-region of the document reader 110 of the image forming apparatus 100 according to the second embodiment will now be described with reference to a flowchart.

FIG. 10 is a flowchart illustrating an example process of specifying the output mode depending on a document scanning sub-region of the document reader of the image forming apparatus according to the second embodiment.

As illustrated in FIG. 10, when the output mode of a document placed on the document table 111 is to be specified by the document reader 110 of the image forming apparatus 100 according to the second embodiment, first, the document is placed on the document table 111 (step S201). The document is then read in the document scanning region 2110 of the document table 111 (step S203).

In the document reader 110, then the process to be executed on the acquired image is selected depending on the document scanning sub-region in which the document is scanned (step S205).

In the document reader 110, then whether the document has been scanned in the copy sub-region 2111 (step S207) is determined. If it is determined in step S207 that the document has been scanned in the copy sub-region 2111, a copying process is selected by the process selector 190 and executed (step S209).

If it is determined in step S207 that the document has not been scanned in the copy sub-region 2111, step S211 is performed to determine whether the document has been scanned in the transmission sub-region 2112 (step S211).

If it is determined in step S211 that the document has been scanned in the transmission sub-region 2112, a transmission process is selected by the process selector 190 and an image transmission process is executed (step S213). If it is determined in step S211 that the document has not been scanned in the transmission sub-region 2112, step S201 is performed, and a document is placed on the document table 111 again. A document scanning process is performed in this way.

The image forming apparatus 100 according to the second embodiment having the above-described configuration includes a process selector 190 that functions to select an output mode of a document depending on the document scanning region of the document reader. Thus, the user can simply place the document in the image scanning sub-region for the desired process to instruct the execution of either a copying process or an image transmission process.

Third Embodiment

A third embodiment will now be described with reference to the accompanying drawings.

The image forming apparatus 100 according to the third embodiment is the same as the image forming apparatus 100 according to the first embodiment, except that the output mode of a document is specified depending on the scanning mode of the document.

Note that, components having the same functions as those according to the first embodiment are denoted by the same reference signs, and descriptions thereof are omitted.

The image forming apparatus 100 has two modes for scanning a document: a mode for scanning a document one by one using the document table 111 and a mode for automatically scanning multiple documents using the automatic document feeder 112.

In the mode for scanning a document placed on the document table 111, the process selector 190 instructs a copying of the scanning image. In the mode for scanning documents using the automatic document feeder 112, the process selector 190 instructs saving of the scanning image.

Note that, the output modes (for example, output for copying, transmission, storage, and facsimile) assigned to the document scanning sub-regions can be appropriately selected or changed.

Process of Scanning Document

The process of specifying the output mode depending on the scanning mode of the document reader 110 of the image forming apparatus 100 according to the third embodiment will now be described with reference to a flowchart.

Figure 11:
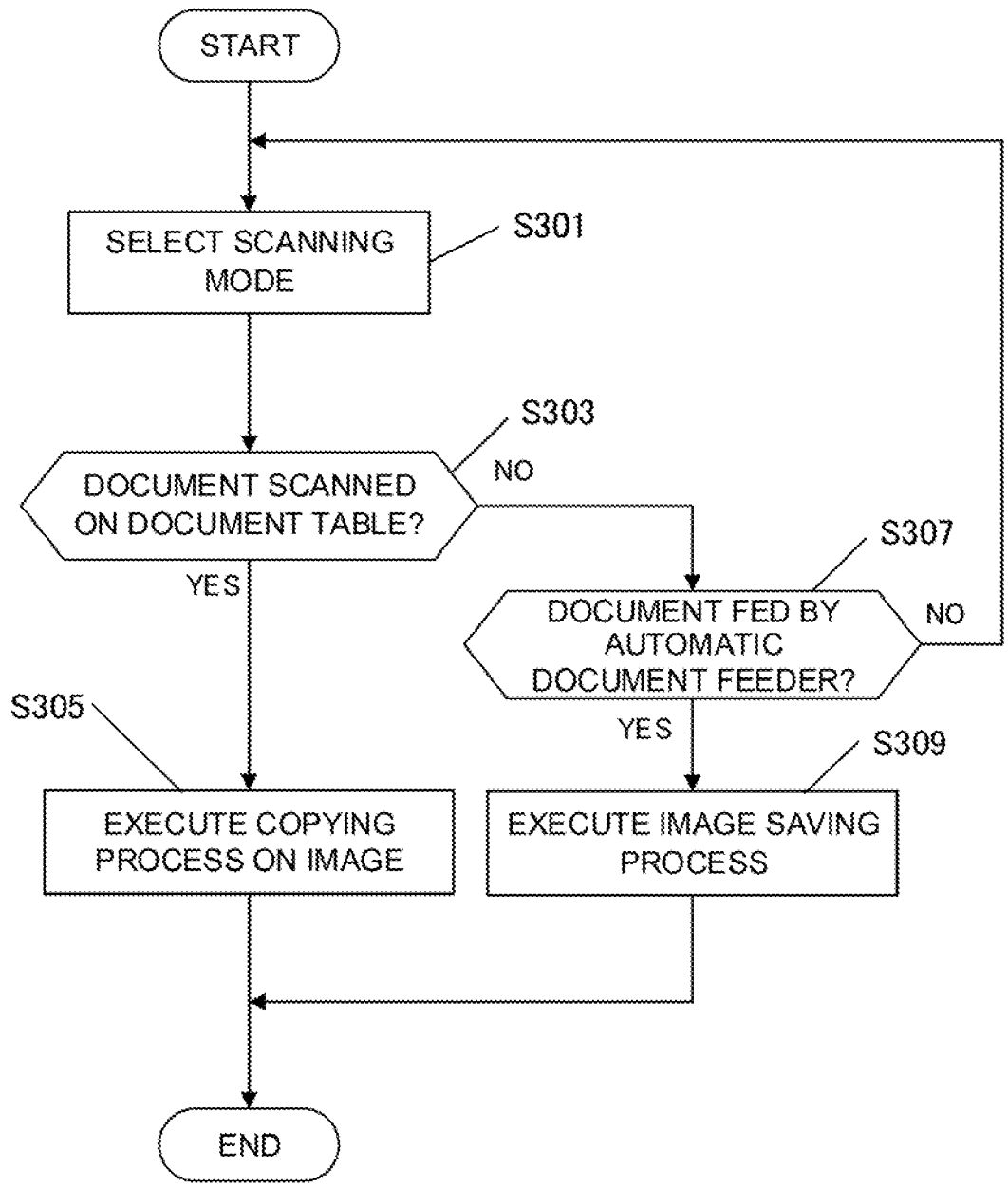
FIG. 11 is a flowchart illustrating an example process of selecting an output mode depending on a document scanning mode in an image forming apparatus according to a third embodiment.

FIG. 11 is a flowchart illustrating an example process of specifying the output mode depending on the scanning mode of the image forming apparatus according to the third embodiment.

As illustrated in FIG. 11, when a document is to be scanned by the document reader 110 of the image forming apparatus 1100 according to the third embodiment, first, the scanning mode is selected (step S301). It is then determined whether the scanning mode is for scanning a document placed on the document table 111 (step S303).

If it is determined in step S303 that the scanning mode is for scanning a document placed on the document table 111, a copy process is executed on the image (step S305).

If it is determined in step S303 that the scanning mode is not for scanning a document placed the document table 111, it is determined whether the scanning mode is for scanning the document fed by the automatic document feeder 112 (step S307).

If it is determined in step S307 that the scanning mode if for scanning a document fed by the automatic document feeder 112, a process for saving the image is executed (step S309).

If it is determined in step S307 that the scanning mode is not for scanning a document fed by the automatic document feeder 112, step S301 is performed, and the scanning mode is reselected. A document scanning process is performed in this way.

The image forming apparatus 100 according to the third embodiment having the above-described configuration includes a process selector 190 that functions to specify an output mode of a document depending on the document scanning mode. Thus, the user can simply select the document scanning mode to instruct the execution of a desired process on an image.

As described above, the present invention is not limited to the above-described embodiments, and various modifications can be made within the scope indicated in the claims. It is apparent to those skilled in the art that various modifications or corrections may be made within the scope of the appended claims, that is, embodiments obtained by combining various modifications of the technical means within the scope of the present invention are also included the scope of the invention.

What is claimed is:

1. An image forming apparatus comprising:
   a document reader that scans a document on a region where the document is to be scanned and outputs an image of the document, wherein the region is able to place the plurality of the documents;
   process selector circuitry that selects a process to be executed on the image depending on the region that the document is to be scanned of the document reader, the documents placing on the region being scanned; and
   controller circuitry that performs control to execute the process selected by the process selector circuitry on the image.

2. The image forming apparatus according to claim 1, wherein the controller circuitry executes a scanning process corresponding to a format of the document depending on the document scanning region.

3. The image forming apparatus according to claim 1, wherein the controller circuitry executes a scanning process corresponding to a language of the document depending on the document scanning region.

4. The image forming apparatus according to claim 1, wherein the controller circuitry establishes a naming rule for naming a file of image data of the document depending on the document scanning region.

5. The image forming apparatus according to claim 1, wherein the controller circuitry specifies a file format of image data of the document depending on the document scanning region.

6. The image forming apparatus according to claim 1, wherein the controller circuitry specifies a storage destination of image data of the document depending on the document scanning region.

7. The image forming apparatus according to claim 1, wherein the controller circuitry specifies a transmission destination of image data of the document depending on the document scanning region.

8. The image forming apparatus according to claim 1, wherein the controller circuitry specifies an output mode of image data of the document depending on the document scanning region.

9. The image forming apparatus according to claim 1, wherein
   the document reader comprises a document table on which the document is placed, and
   the document reader scans the document placed on the document table.

10. The image forming apparatus according to claim 1, wherein
    the document reader comprises an automatic document feeder that automatically feeds the document, and
    the document reader scans the document fed by the automatic document feeder.

11. The image forming apparatus according to claim 9, wherein the process selector circuitry specifies an output mode of image data of the document depending on a mode for scanning the document.

12. The image forming apparatus according to claim 1, wherein the document reader is divided into a plurality of regions.

13. The image forming apparatus according to claim 1, wherein
    the document reader comprises a document table on which the document is placed, and
    the document reader divides a scannable region of the document table into a plurality of regions.

14. A method of processing a scanning image, comprising:

scanning a document on a region where the document is to be scanned, wherein the region is able to place the plurality of the documents;

outputting an image of the document;

selecting a process to be executed on the image depending on the region that the document is to be scanned, the document placing on the region being scanned by scan for the document; and performing control to execute a process selected by selection of a process to be executed on the image.

15. A non-transitory computer-readable medium that stores an instruction for scanning image processing program that causes a computer to:

scan a document on a region where the document is to be scanned, wherein the region is able to place the plurality of the documents;

output an image of the document;

select a process to be executed on the image by scan for a document depending on the region that the document is to be scanned, the documents placing on the region being scanned; and perform control to execute the process selected by selection of a process to be executed on the image.

\* \* \* \* \*